Jan. 30, 1968  W. B. LEWIS ETAL  3,366,545
METHOD OF OPERATING A PLURALITY OF REACTORS
Filed Oct. 4, 1965

INVENTORS
WILFRID B. LEWIS
HENRY H. CLAYTON
DONALD G. HURST
By
PATENT AGENT

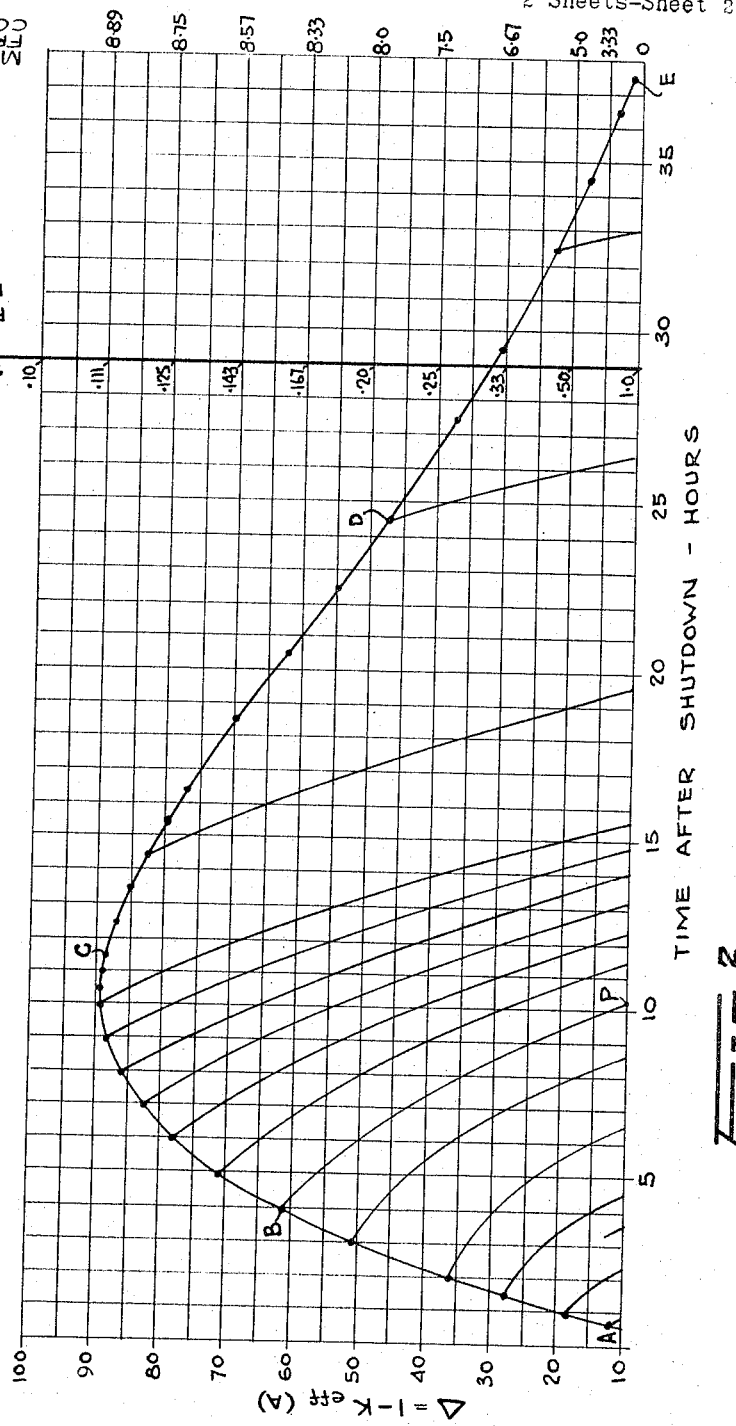

United States Patent Office 3,366,545
Patented Jan. 30, 1968

3,366,545
METHOD OF OPERATING A PLURALITY OF REACTORS
Wilfrid Bennett Lewis, Henry Hubert Clayton, and Donald Geoffrey Hurst, Deep River, Ontario, Canada, assignors to Atomic Energy of Canada Limited, Ottawa, Ontario, Canada, a corporation
Filed Oct. 4, 1965, Ser. No. 492,633
Claims priority, application Canada, Feb. 24, 1965, 924,061
1 Claim. (Cl. 176—28)

ABSTRACT OF THE DISCLOSURE

A nuclear reactor assembly made up of two or more spaced, separate reactor cores adapted such that the neutron leakage from one reactor may be used to burn xenon in an adjacent core should that core become poisoned-out on shut-down. Each core is provided with booster rods to compensate for loss of reactivity due to the inability of a shut-down, adjacent core to provide leakage neutrons.

Figure 1:
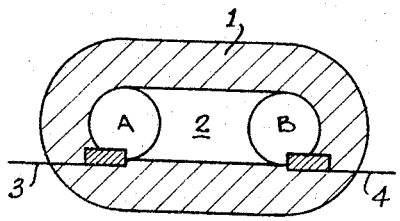

This invention relates to coupled reactors and more particularly to a method of operating a plurality of reactors such that the neutron leakage from one of the reactors may be used to burn xenon poison in an adjacent, poisoned-out reactor.

One of the problems involved in the operation of a nuclear reactor is that of start-up of a poisoned reactor after a shut-down of a few hours. The poisoning of thermal reactors by fission products is a well-known phenomenon. The most important poison is xenon-135 produced by decay of the direct fission product tellurium-135 to iodine-135 which in turn decays to xenon-135. Xenon-135 has an absorption cross-section for thermal neutrons of about $3.5 \times 10^6$ barns, much greater than that of any other of the poisons produced. When the reactor is under operation, the concentration of xenon-135 in the reactor remains at an equilibrium value. The poison is being constantly produced but it is being constantly removed mainly as a result of conversion to xenon-136 by absorption of neutrons and to a lesser extent as a result of natural decay. The reactor must have sufficient reactivity in excess of that which would be required in the absence of xenon-135 poisoning to provide the thermal neutrons consumed in maintaining this equilibrium value.

After a reactor has been shut down the removal of xenon-135 as a result of thermal neutron absorption ceases. The iodine-135 which has already been formed continues to decay and produce more xenon-135. Since the rate of removal of xenon-135 has decreased, the concentration of xenon-135 begins to increase and continues to do so until it reaches a maximum at which the rate of production of xenon-135 is equal to the loss of xenon-135 by decay. After this peak of xenon poisoning has been reached, the xenon-135 concentration gradually decreases again. The time interval after reactor shut-down for peak poisoning to be reached is about ten hours and the time interval for the poisoning to decrease to the equilibrium value of normal reactor operation is of the order of forty hours. This means that if a reactor is shut-down for any reason (repair, maintenance, fuel changing) it must be started up again almost immediately or left idle for nearly forty hours unless the reactor has sufficient excess reactivity either built-in or in an external store that can be called upon to override the xenon poisoning. To build a reactor with the necessary excess reactivity involves a considerable power cost penalty and would probably make the reactor uneconomic in relation to other power sources.

Another problem involved in operating reactors especially those of larger power output ratings is that of xenon oscillations across the core of the reactor. In large cores there may be a tendency for one location in the core to be at lower power than the remainder due to an excess build-up of xenon in that area. Neutrons will flow from the "up" parts of the core to this "down" section and reduce the effect of the excess poisoning. This location then increases in power until it is at higher power than other sections. Because of the time delay involved in the production and removal of xenon an oscillation effect may be set up throughout the core. This is undesirable because a reactor is most economic when the flux level (power output) is the same for all parts of the core. To obviate this effect it is the usual practice to have control means in different parts of the core so that the flux levels at different locations can be controlled either individually or in unison as required. It might be preferable however for large power stations to have separate cores rather than one large one.

It is an object of the present invention to provide a power station capable of producing large power output wherein the station can be partially shut down for repair, maintenance, fuel changing, etc., and brought up to full power again much more quickly than normal.

Another object of the invention is the provision of a large power station wherein the problems encountered due to xenon oscillations have been decreased.

These and other objects of the invention are achieved by a nuclear power reactor comprising a plurality of separate cores, said cores being positioned adjacent each other with the neutron reflector surrounding all cores such that neutron leakage from any one of the cores may be used to burn xenon in an adjacent, poisoned-out core.

Figure 2:
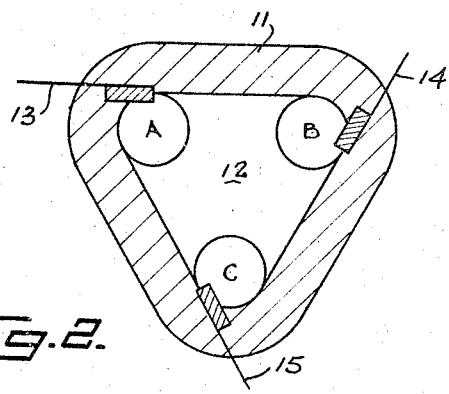
Figure 4:
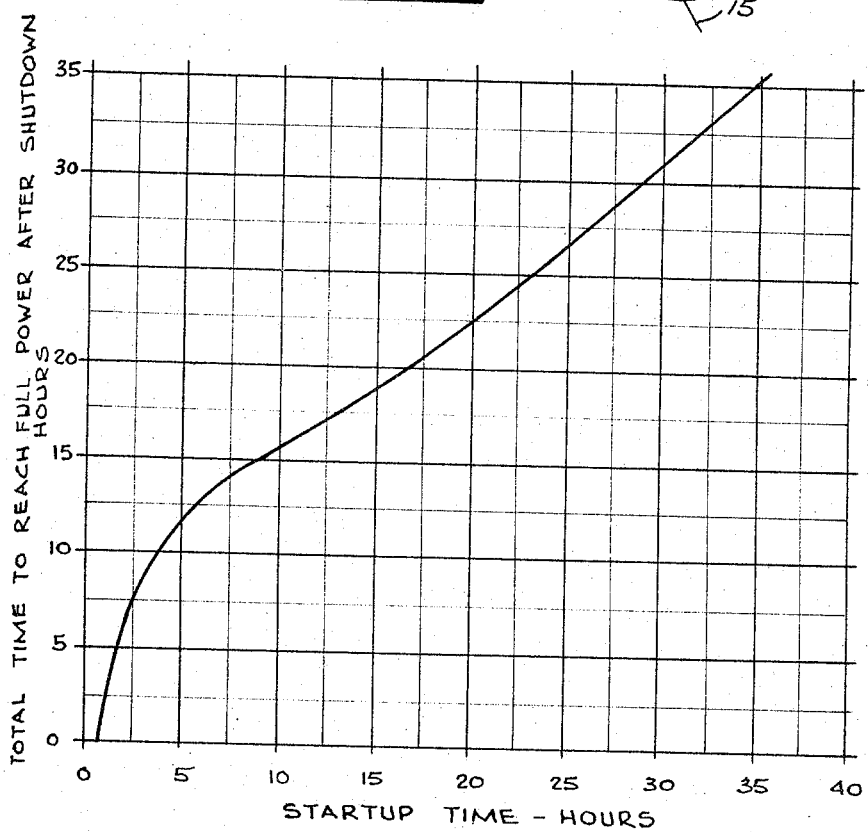

In drawings which illustrate embodiments of the invention,
FIGURE 1 is a schematic representation of two separate reactor cores enclosed by a common reflector,
FIGURE 2 is similar to FIGURE 1 but showing three cores,
FIGURE 3 is a graph showing the relationship between time after shut-down and a parameter $\Delta$ (the amount a core is below criticality),
FIGURE 4 is a graph derived from the graph of FIGURE 3 and shows the relationship of start-up time to total time to reach full power after shut-down.

Referring to FIGURE 1, two reactor cores A and B are shown positioned relatively close together and completely surrounded by a neutron reflector and shield 1. The intermediate space 2 between the two cores is left free of shielding material to allow flow of neutrons escaping from one core to arrive at the other. Booster rods 3 and 4 are shown in schematic form. The reactor cores are normally contained in right cylindrical tanks known as calandrias and, in the reactors presently being built, lie on their sides with fuelling taking place from both ends. Control of the reactors may be by control rods inserted through the shielding from the top or the ends, however other forms of control such as moderator level control and the insertion of poisons into predetermined locations in the reactor cores may be used. It should be pointed out that many different forms of reactors may be used in conjunction with this novel arrangement and therefore it is not considered necessary to describe the detailed design of reactors as such on which much literature is available.

FIGURE 2 shows a reactor set-up wherein three cores A, B, and C with booster rods 13, 14, and 15 are positioned in juxtaposition.

In discussing the operation of the reactor system spatial and other secondary effects on reactivity ($k$) are neglected. Considering now the system having two cores (FIGURE 1), during normal operation neutrons representing a fractional leakage ($\epsilon$) pass from core A to core B and vice versa. Thus while each core separately is subcritical by $\delta k \approx \epsilon$, the combination is critical. If A is shut down for any reason, to keep B at power requires that it be made critical by adding a reactivity increment equal to $\epsilon$. This can be done by means of the booster rods. Core A will still receive leakage neutrons from core B at the same rate and if core A is an amount $\Delta$ below critical ($\Delta = 1 - k_{eff}(A)$) these neutrons will generate a fraction $\epsilon/\Delta$ of A's full power. Initially $\Delta$ is the value resulting from the shut-down. Later, the value of $\Delta$ may be determined by the ability of the operating staff to provide reactivity in core A. If $\Delta$ can be made equal to $\epsilon$ the normal operating condition has been restored. It has been found that in conditions that correspond to poison-out of core A, i.e. $\Delta$ greater than $\epsilon$, the influx of neutrons from core B will result in a quicker recovery of core A.

In FIGURE 3 the curve ABCDE shows $\Delta$ (in milli-$k$) as a function of time after shut-down assuming no burn-up of poison for a typical combination according to the invention. It is assumed that the inter-core leakage ($\epsilon$) is equal to 10 milli-$k$ (one percent inter-core leakage). The curve crosses the 10 milli-$k$ line at 0.53 hour after shut-down and prior to that time the reactor can be brought to full power as soon as control is re-established. This time can be considered as "the time to poison." Point B on the curve illustrates the case where there has been a four-hour delay before the reactivity mechanisms of the reactor core can be brought to their normal state. At this point $\Delta$ is 62 milli-$k$ and the power of core A can be raised to 10/62 of full power. This power is sufficient to burn out xenon fairly rapidly and instead of $\Delta$ following the upper curve to CDE it decreases along BP and at point P normal power is regained. At point P the booster of core A is still fully inserted. The poison-out is thus terminated at 10.2 hours instead of 38 hours. Even before 10.2 hours the power is a large fraction of normal. Each of the other curves sloping down from ABCDE shows the course of recovery if the reactor is brought to "start-up" at the time where the curve meets ABCDE.

Because the power of core A is a fraction ($\epsilon/\Delta$) of its normal power, and the milli-$k$ required from the booster in core B is $$\epsilon - \epsilon \frac{\text{Power of core A}}{\text{Normal power of core A}}$$
$$= \epsilon(1 - \epsilon/\Delta)$$

both of these quantities are functions of $\Delta$ only and may be read off the appropriate scales on the right hand side of the figure.

FIGURE 4 is a plot of total time to reach full power after shut-down as a function of "start-up" time. For example, if start-up time is 4 hours then total time to reach full power is 10.2 hours. If start up time is 10 hours then total time to reach full power is approximately 15.5 hours. It will be seen that a considerable time saving over a normal poison-out can be achieved by the use of the invention.

In general for large power reactors, the splitting into at least two cores and the provision of suitable booster rods gives the possibility of shutting down one core and recovering full power with much reduced poison-out time. In addition, the power station will still be capable of delivering half-power which might be an advantage in many cases.

What is claimed is:
1. A method of operating a nuclear power reactor comprising:
   (a) dividing the reactor into two cores,
   (b) surrounding the two cores with a unitary reflector such that an essentially unobstructed path for leakage neutrons is left between the cores,
   (c) operating the said two cores together as a unit, each of said cores being sub-critical if operated individually but critical in combination due to leakage neutrons received from the other core providing sufficient additional reactivity to achieve criticality,
   (d) shutting down a first one of said cores,
   (e) adding booster fuel to the second core to compensate for the loss of neutrons normally received from the first core and maintain the said core at criticality, and
   (f) re-starting said first core.

References Cited

UNITED STATES PATENTS

| 3,068,161 | 12/1962 | Cawley | 176—21 |
| 3,086,929 | 4/1963 | Tunnicliffe | 176—21 X |
| 3,236,737 | 2/1966 | Frame et al. | 176—40 X |
| 3,276,964 | 10/1966 | West et al. | 176—20 |
| 3,293,137 | 12/1966 | Hutchinson et al. | 176—20 |

FOREIGN PATENTS

| 1,376,020 | 9/1964 | France. |
| 1,386,555 | 12/1964 | France. |

REUBEN EPSTEIN, *Primary Examiner.*